US012622506B2

(12) United States Patent
Farmer, II

(10) Patent No.: US 12,622,506 B2
(45) Date of Patent: May 12, 2026

(54) BELT FOR CARRYING A TREE STAND AND EQUIPMENT FOR HUNTING

(71) Applicant: Don R. Farmer, II, White Lake, MI (US)

(72) Inventor: Don R. Farmer, II, White Lake, MI (US)

( * ) Notice: Subject to any disclaimer, the term of this patent is extended or adjusted under 35 U.S.C. 154(b) by 379 days.

(21) Appl. No.: 18/300,963

(22) Filed: Apr. 14, 2023

(65) Prior Publication Data

US 2023/0248135 A1 Aug. 10, 2023

Related U.S. Application Data

(63) Continuation-in-part of application No. 17/348,762, filed on Jun. 16, 2021, now Pat. No. 12,064,024.

(60) Provisional application No. 63/310,102, filed on Feb. 14, 2022, provisional application No. 63/039,091, filed on Jun. 15, 2020.

(51) Int. Cl.
| | |
|---|---|
| *A45F 3/08* | (2006.01) |
| *A01M 31/02* | (2006.01) |
| *A45F 3/00* | (2006.01) |
| *A45F 3/04* | (2006.01) |

(52) U.S. Cl.
CPC ............... *A45F 3/08* (2013.01); *A01M 31/02* (2013.01); *A45F 2003/003* (2013.01); *A45F 2003/045* (2013.01)

(58) Field of Classification Search
CPC ................. A45F 3/14; A45F 3/08; A45F 3/10
USPC ......................................... 224/153, 627, 633
See application file for complete search history.

(56) References Cited

U.S. PATENT DOCUMENTS

| | | | | |
|---|---|---|---|---|
| 2,141,041 | A | | 12/1938 | Knight |
| 3,004,519 | A | | 10/1961 | Weissman |
| 3,065,821 | A | * | 11/1962 | Hundley, Jr. ......... A01M 31/02 |
| | | | | 182/187 |
| 3,347,429 | A | * | 10/1967 | Ruth, Jr. ................... A45F 3/04 |
| | | | | 224/641 |
| 3,856,111 | A | | 12/1974 | Baker |
| 4,049,164 | A | * | 9/1977 | Sullivan ................. B63C 11/22 |
| | | | | 224/633 |
| 4,327,852 | A | | 5/1982 | Gibson |
| 4,475,627 | A | | 10/1984 | Eastridge |
| 4,582,165 | A | | 4/1986 | Latini |
| 4,802,552 | A | | 2/1989 | Williams |
| 4,858,364 | A | * | 8/1989 | Butts ..................... A01K 97/10 |
| | | | | 224/922 |

(Continued)

*Primary Examiner* — Nathan J Newhouse
*Assistant Examiner* — Lester L Vanterpool
(74) *Attorney, Agent, or Firm* — HSML P.C.

(57) ABSTRACT

A harness system and a belt for carrying a hunting tree stand are described. The belt includes a body panel that attaches to a first elongated member and a second elongated member. A panel strap extends from one of the first elongated member and the second elongated member. A side buckle attaches to another one of the first elongated member and the second elongated member. The side buckle is configured to be operationally coupled with the panel strap. The side buckle and the panel strap are configured to tighten around and secure the belt to the user. A first hunting tree stand strap and a second hunting tree stand strap extend from the body panel. The first hunting tree stand strap and the second hunting tree stand strap are configured to firmly hold the first section of the hunting tree stand against the body panel.

20 Claims, 13 Drawing Sheets

(56)                References Cited

U.S. PATENT DOCUMENTS

| | | | | |
|---|---|---|---|---|
| 5,265,780 | A | * | 11/1993 | Matthews ................. A45F 4/02 |
| | | | | 182/187 |
| 5,360,384 | A | * | 11/1994 | Toensing ........... A63B 21/4009 |
| | | | | 482/43 |
| 5,413,262 | A | * | 5/1995 | Dewire ................... A41F 9/002 |
| | | | | 224/675 |
| 5,433,697 | A | * | 7/1995 | Cox ........................ A61F 5/028 |
| | | | | 602/19 |
| 5,690,609 | A | * | 11/1997 | Heinze, III ............... A61F 5/03 |
| | | | | 2/311 |
| 5,904,282 | A | * | 5/1999 | Gleason ................... A45F 3/08 |
| | | | | 224/636 |
| 5,927,574 | A | * | 7/1999 | Ruesink ............... F41C 33/003 |
| | | | | 224/907 |
| 5,961,014 | A | | 10/1999 | Knerr |
| 6,135,334 | A | | 10/2000 | Seichter |
| 6,199,731 | B1 | | 3/2001 | Lehoux |
| 6,315,177 | B1 | | 11/2001 | Weatherall |
| D490,938 | S | | 6/2004 | Wydner |
| 8,418,899 | B1 | | 4/2013 | Stamps |
| 8,708,284 | B2 | | 4/2014 | Gummeson |
| D713,049 | S | * | 9/2014 | Shah ............................ D24/200 |
| 8,920,353 | B2 | * | 12/2014 | Hinshon ................. A61F 5/028 |
| | | | | 602/5 |
| 9,642,444 | B2 | | 5/2017 | Krol |
| 2003/0042076 | A1 | | 3/2003 | Ulrich |
| 2005/0192159 | A1 | * | 9/2005 | Jackson ................... A45F 3/14 |
| | | | | 482/23 |
| 2008/0296327 | A1 | * | 12/2008 | Murdoch ............... A45F 5/021 |
| | | | | 224/195 |
| 2009/0294500 | A1 | | 12/2009 | Brown et al. |
| 2011/0259934 | A1 | * | 10/2011 | O'Ryan ................... A45F 3/10 |
| | | | | 224/627 |
| 2012/0061180 | A1 | | 3/2012 | Phillips |
| 2014/0310921 | A1 | * | 10/2014 | Mohri .................... A41F 9/002 |
| | | | | 24/199 |
| 2014/0361055 | A1 | | 12/2014 | Myers |

* cited by examiner

BELT FOR CARRYING A TREE STAND AND EQUIPMENT FOR HUNTING

FIELD

The present disclosure relates to a harness system for carrying a tree stand for hunting. More specifically, the disclosure related to a harness system that includes a belt for carrying the tree stand and other equipment for hunting.

BACKGROUND

In some outdoor recreational sports, such has hunting, a user (e.g., a hunter) may stay off the ground level for safety, to obtain a vantage point, to stay outside the field of vision of the animal being hunted (e.g., deer), or the like. A hunting tree stand may be used/attached to a tree for the user to sit or stand therein so that the user can be positioned above ground level. When a user prepares to hunt using a hunting tree stand, they often hike to a remote location in the woods, carrying the tree stand, climbing sticks to aid with climbing a tree, and other equipment useful for hunting.

SUMMARY

The present disclosure relates to a harness system for carrying a tree stand for hunting. More specifically, the disclosure related a harness system that includes a belt for carrying the tree stand and other equipment for hunting.

A hunting tree stand is configured to be deployed and attached to a tree allowing the user to stay on the deployed/ attached stand for an extended period of time while waiting for an animal. The user may carry the stand on their body and hike to a desired hunting location. The hunting tree stand can be heavy. The harness system can distribute the weight of the stand among the shoulders, the back, and the waist of the user to make carrying the stand more comfortable during the hike. Other hunting equipment may be attached/hung using the harness system such that the user can walk with few or no additional items in their hands.

The side panels and the body panel of the belt can be flexible and compressible to provide better comfort to the user wearing the belt. The side panels can be more rigid (i.e., relative to fabric straps) and to dampen and/or restrict the movements of uncoupled belt components (e.g., undone buckles), reducing and/or preventing the components from knocking together and creating unwanted noise.

Any loosely attached components of the hunting tree stand (e.g., the platform, the climbing sticks, etc.) and/or other accessories carried by the user may move relative to each other. As the user walks to and/or from a hunting location, the movement of said components and/or accessories can create unwanted noise that disturbs game, such as deer, bear, or the like. The harness system can tightly attach the tree stand and other components to the user avoiding and/or reducing such unwanted noises.

In an embodiment, a belt for carrying a hunting tree stand is described. The belt includes a body panel attaching to a first elongated member and a second elongated member configured to wrap around a user of the belt. A panel strap extends from one of the first elongated member and the second elongated member. A side buckle attaches to another one of the first elongated member and the second elongated member, the side buckle is configured to be operationally coupled with the panel strap, and the side buckle and the panel strap are configured to tighten around and secure the belt to the user. A first hunting tree stand strap and a second hunting tree stand strap are extended from the body panel and configured to extend through the hunting tree stand and encircle at least a first section of the hunting tree stand. The first hunting tree stand strap and the second hunting tree stand strap are configured to firmly hold the first section of the hunting tree stand against the body panel.

In an embodiment, the belt for carrying the hunting tree stand includes a first panel buckle and a second panel buckle attached to the body panel configured to receive the first hunting tree stand strap and the second hunting tree stand strap.

In an embodiment, the body panel includes a first slot and a second slot configured to receive the first hunting tree stand strap and the second hunting tree stand strap, the first slot and the second slot allow the first hunting tree stand strap and the second hunting tree stand strap to extend through the body panel and couple to fixed ends of the first hunting tree stand strap and the second hunting tree stand strap.

In an embodiment, the body panel includes an upper portion and a lower portion opposite from the upper portion, and the first hunting tree stand strap and the second hunting tree stand strap extend from the upper portion of the body panel and are configured to be received by a first slot and a second slot disposed in the lower portion of the body panel, respectively.

In an embodiment, the belt includes a first body panel buckle and a second body panel buckle disposed on the body panel, wherein the first body panel buckle and the second body panel buckle are configured to receive free ends of the first hunting tree stand strap and the second hunting tree stand strap extend through a first slot and a second slot on the body panel.

In an embodiment, the side buckle is disposed on the other one of the first elongated member and the second elongated member.

In an embodiment, the side buckle is a slip buckle having a plurality of slots, the side buckle is configured to couple with the panel strap by receiving a free end on the panel strap through the plurality of slots so that noise from movable buckle components is avoided.

In an embodiment, the belt includes a body panel padding configured to be disposed between a first body panel buckle and the user.

In an embodiment, the body panel padding hinges to an upper portion of the body panel such that the body panel padding can be opened to reveal the body panel, a first slot on the body panel, a second slot on the body panel, the first body panel buckle, and a second body panel buckle.

In an embodiment, the belt includes a first panel buckle and a second panel buckle attached to fixed ends of the first hunting tree stand strap and the second hunting tree stand strap, respectively, and the fixed ends of the first hunting tree stand strap and the second hunting tree stand strap being attached to the body panel.

In an embodiment, the side buckle is attached to a fixed end of the panel strap.

In an embodiment, the panel strap extends over the first elongated member, the second elongated member, and the body panel to extend out from the one of the first elongated member and the second elongated member.

In an embodiment, a body panel strap is disposed on the body panel and selectively attaches to the body panel at a plurality of attaching sections to form at least one flat strap loops.

In an embodiment, a body panel strap is disposed over the panel strap that is disposed over the body panel.

In an embodiment, the belt includes a third tree stand strap and a fourth hunting tree stand strap attached to the body panel and configured to extend through the hunting tree stand and encircle at least a second section of the hunting tree stand. The third hunting tree stand strap and the fourth hunting tree stand strap are configured to firmly hold the second section of the hunting tree stand against the first section of the hunting tree stand and the body panel, and the second section is movable relative to the first section prior to being held by the third hunting tree strap and the fourth hunting tree strap, and, by firmly hold the second section against the first section of the hunting tree stand, and the body panel, noise from movements among the first section of the hunting tree stand, the second section of the hunting tree stand, and/or the body panel is avoided.

In an embodiment, a harness system for carrying a hunting tree stand is described. The harness system includes a harness assembly configured to attach to the hunting tree stand; and a belt configured to attach to the hunt tree stand to a user. The belt includes a body panel attaching to a first elongated member and a second elongated member configured to wrap around a user of the belt. A panel strap extends from one of the first elongated member and the second elongated member. A side buckle attaches to another one of the first elongated member and the second elongated member and configured to be operationally coupled with the panel strap. The side buckle and the panel strap are configured to tighten around and secure the belt to the user. A first hunting tree stand strap and a second hunting tree stand strap extend from the body panel and are configured to extend through the hunting tree stand and encircle at least a first section of the hunting tree stand. The first hunting tree stand strap and the second hunting tree stand strap are configured to firmly hold the first section of the hunting tree stand against the body panel. In an embodiment, In an embodiment, the harness assembly includes: a first upper strap and a second upper strap each having a first end portion, a second end portion, and an intermediate portion disposed between the first and second end portions thereof, and a bridging strap having a first end portion and a second end portion, the first end portion of the bridging strap being coupled to the intermediate portion of the first upper strap and further coupled to the intermediate portion of the second upper strap such that a retention loop is formed by the bridging strap, the first end portion of the first upper strap, a upper strap buckle, and the first end portion of the second upper strap, the retention loop configured to extend through the hunting tree stand and encircle at least one ladder section of the hunting tree stand and to firmly hold the at least one ladder section against a back side of the hunting tree stand.

In an embodiment, the belt includes the body panel includes an upper portion and a lower portion opposite from the upper portion, and the first hunting tree stand strap and the second hunting tree stand strap extend from the upper portion of the body panel and are configured to be received by a first slot and a second slot disposed in the lower portion of the body panel, respectively.

In an embodiment, the belt includes that a first body panel buckle and a second body panel buckle are disposed on the body panel, wherein the first second body panel buckle and the second body panel buckles are configured to receive free ends of the first hunting tree stand strap and the second hunting tree stand straps extends through a first slot and a second slot on the body panel.

In an embodiment, the belt includes that a body panel strap is disposed on the body panel and selectively attaches to the body panel at a plurality of attaching sections to form at least one flat strap loops, wherein the body panel strap is disposed over the panel strap that is disposed over the body panel.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
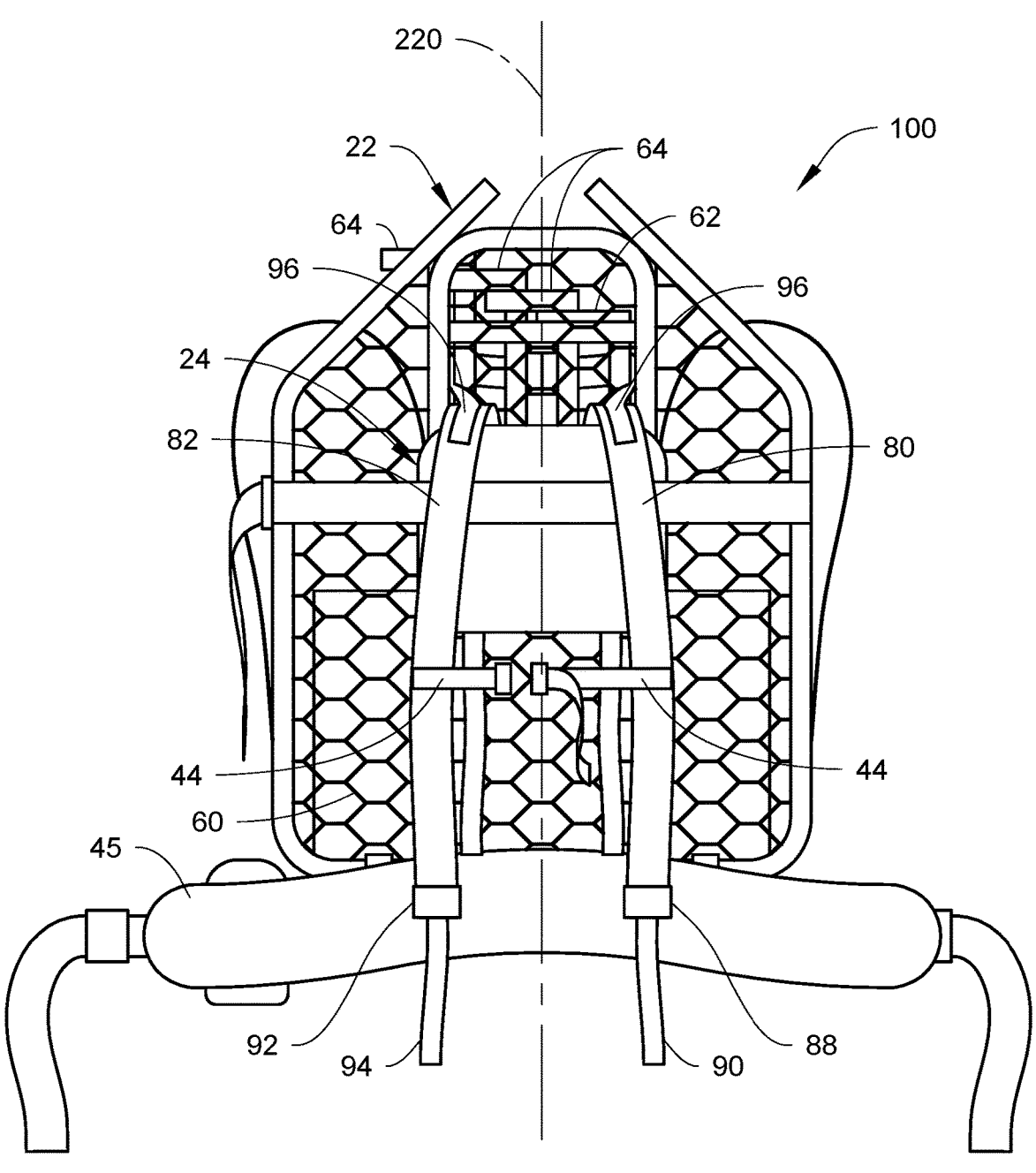
FIG. 1 is a schematic view of a harness system attached to a hunting tree stand, according to an embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

The present disclosure relates to a harness system for carrying a tree stand for hunting. More specifically, the disclosure related a harness system that include a belt for carrying the tree stand and other equipment for hunting.

Figure 2:
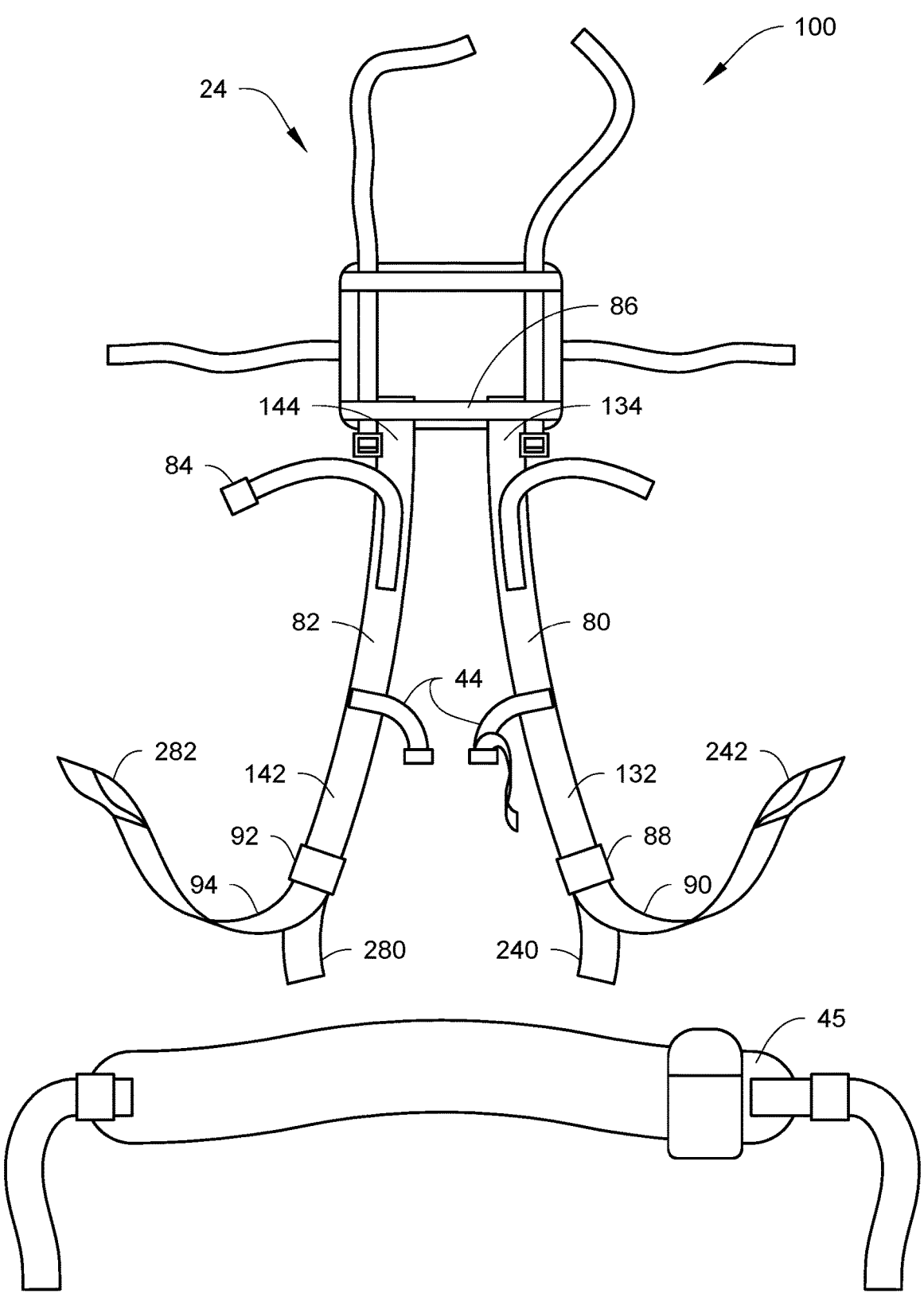
FIG. 2 is a schematic view of a harness system in FIG. 1, according to an embodiment.
Figure 3:
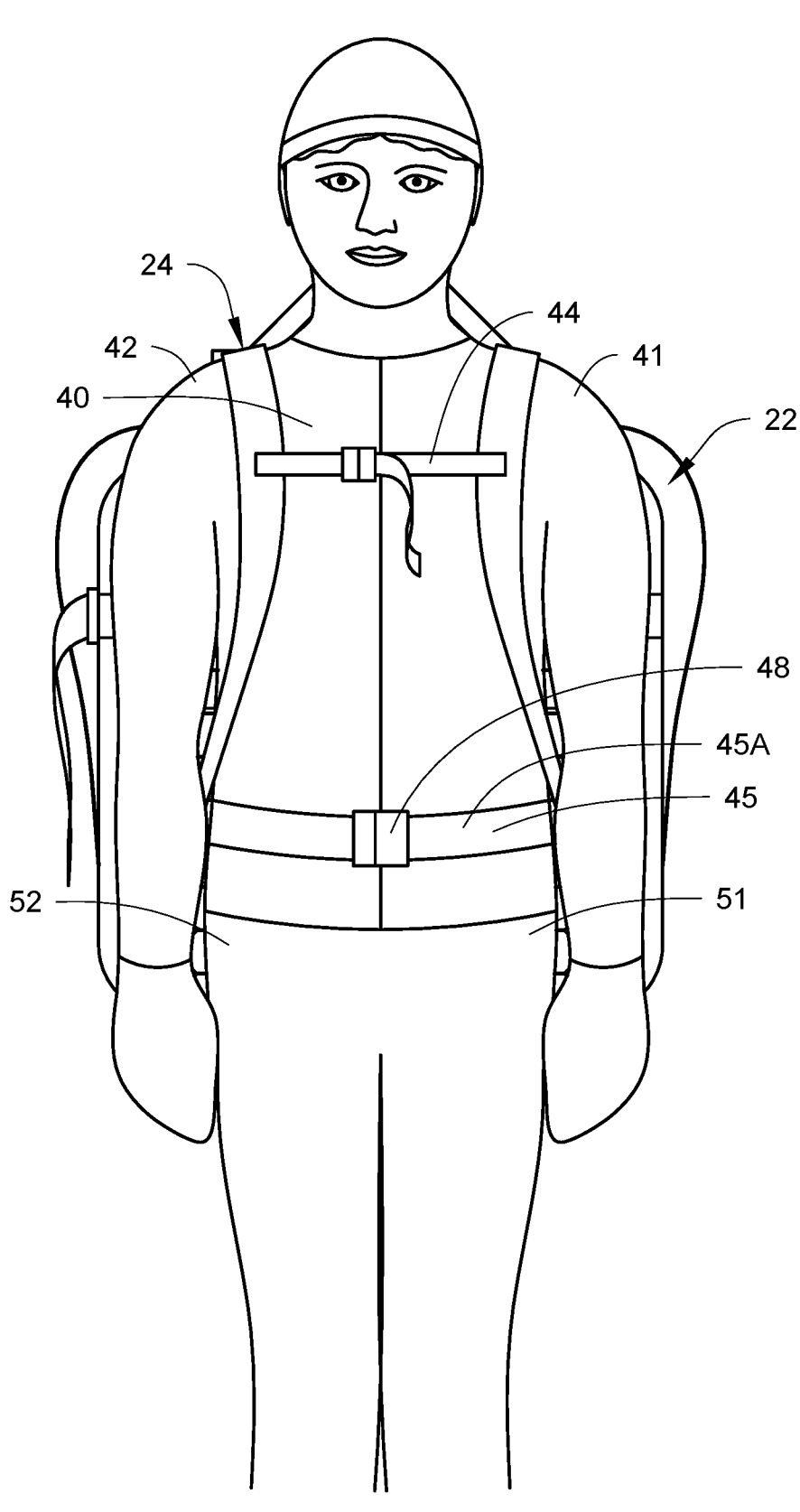
FIG. 3 is a front view of a user wearing a harness system to carry a tree stand, according to an embodiment.
Figure 4:
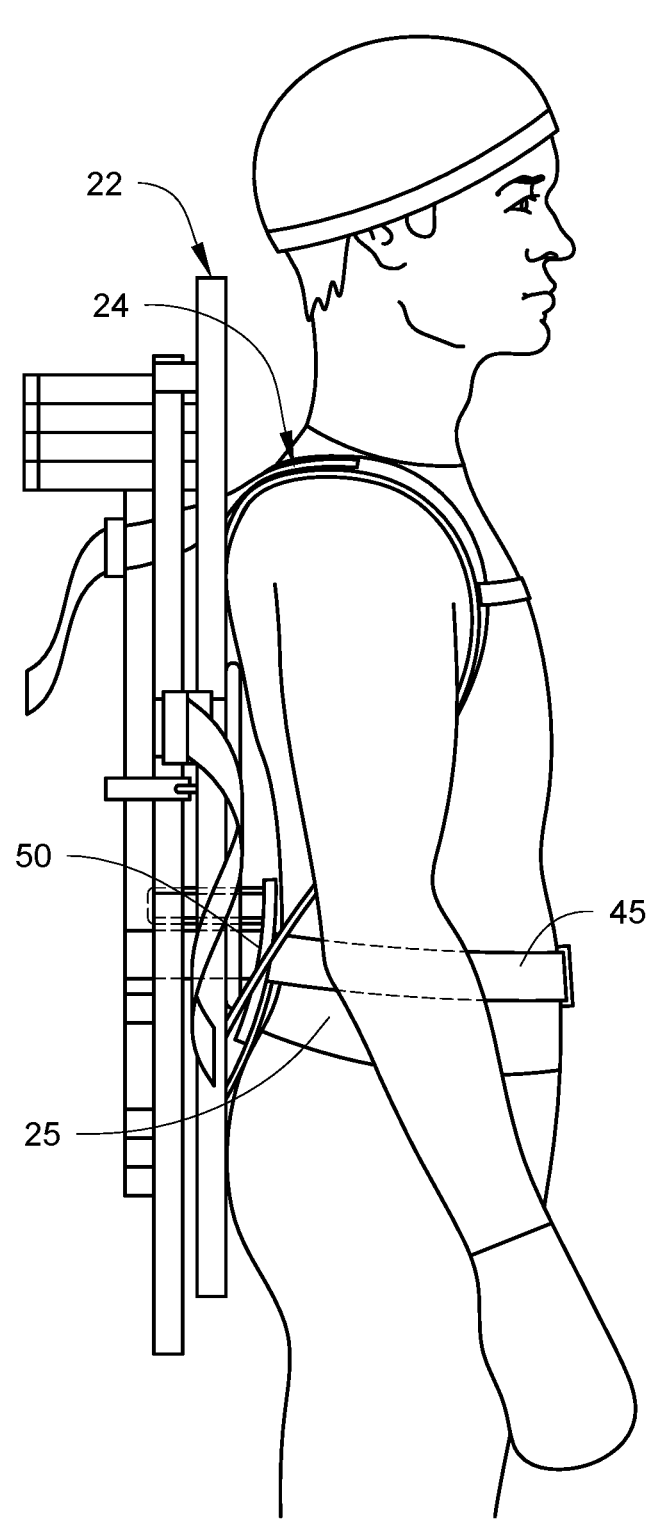
FIG. 4 is a side view of the user using the harness system in FIG. 3, according to an embodiment.

FIG. 1 is a schematic view of a harness system 100 attached to a hunting tree stand 22, according to an embodiment. FIG. 2 is a schematic view of the harness system 100 in FIG. 1, according to an embodiment. As shown in FIG. 2, the harness system 100 is shown not attached to the hunting tree stand 22 to illustrate features of the harness system 100. FIG. 3 is a front view of a user wearing the harness system 100 to carrying the hunting tree stand 22, according to an embodiment. FIG. 4 is a side view of the user using the harness system 100 in FIG. 3, according to an embodiment. FIGS. 3 and 4 illustrate the positioning of the harness system 100 on the user's body.

As shown in FIGS. 1-4, the hunting tree stand 22 ("stand") is configured to be deployed and attached to a tree (not shown) allowing a user to stay on the stand 22 over an extended period of time during hunting. For example, the hunting tree stand is a mechanical system that is configured to be unfolded and attached to a tree. The user may carry the stand 22 on foot to a desired hunting location. The stand 22 can include components such as a hunting platform 60, climbing sticks 62, 64, and the like. The hunting platform 60 may include components, including, but not limited to a top portion and a bottom portion. The components of the hunting tree stand 22 (e.g., the platform 60, the climbing sticks 62, 64, etc.) may move relative to each other such that noise may be created upon contact. The components of the hunting tree stand 22 may be relatively heavy, and the weight distribution of the stand 22 can be disposed among the shoulders, back, and waist of the user by the harness system 100 to be more comfortable to carry.

As shown in FIG. 1, the harness system 100 includes harness assembly 24 and a belt 45 attaching to the stand 22. The harness system 100 attaches to the stand 22 and the user. The harness system 100 allows the user to carry the stand 22 on the user's body.

In the illustrated embodiment, the harness assembly 24 attaches to the stand 22 and provide straps and/or handles for the user the carry the stand 22 on the user's back and shoulders. The belt 45 attaches to the stand 22 to the user's waist so that the weight of the stand 22 can at least partially rest on the waist of the user, reducing the weight distributed the back and/or shoulders of the user.

As shown in FIG. 2, the harness assembly 24 includes a first upper strap 80, a second upper strap 82, an upper strap buckle 84, a bridging strap 86, a first lower strap buckle 88, a first lower strap 90, a second lower strap buckle 92, a second lower strap 94, and a retention loop 96.

The first lower strap 90 has an end portion and the second lower strap 94 has an end portion. The first lower strap 90 is coupled to a first lower strap buckle 88 and the second lower strap 94 is coupled to a second lower strap buckle 92.

The harness assembly 24 includes a bridging strap configured to form a retention loop 96 that holds hunting equipment, such as climbing sticks 62, 64, ladder sections, and the like. When a user is carrying the tree stand 22 and the climbing sticks 62, 64, the retention loop 96 creates a load to pull the climbing sticks 62, 64 securely against the tree stand 22. Firmly holding the climbing sticks 62, 64, against the platform 60 can prevent unwanted noises from the stand 22 that may disturb game, such as deer, bear, and the like, as the user walks to and/or from a hunting location.

The first upper strap 80 has a first end portion 130, a second end portion 132, and an intermediate portion 134 disposed between the first and second end portions 130, 132 thereof.

The second upper strap 82 has a first end portion 140, a second end portion 142, and an intermediate portion 144 disposed between the first and second end portions 140, 142 thereof. The upper strap buckle 84 is coupled to the first end portion 130 of the first upper strap 80 and the first end portion 140 of the second upper strap 82.

The bridging strap 86 has a first end portion and a second end portion. The first end portion is coupled to the intermediate portion 134 of the first upper strap 80 utilizing the plurality of stitches. The bridging strap 86 is further coupled to the intermediate portion 144 of the second upper strap 82 utilizing the plurality of stitches.

The first lower strap buckle 88 is coupled to the second end portion 132 of the first upper strap 80. In particular, the second end portion 132 is disposed through a slot in the first lower strap buckle 88 and then the second end portion 132 is coupled to itself utilizing the plurality of stitches.

A retention loop 96 is formed by the bridging strap 86, the first end portion 130 of the first upper strap 80, the upper strap buckle 84, and the first end portion 140 of the second upper strap 82. The retention loop 96 has a sufficient length to encircle the climbing sticks 62, 64 of the hunting tree stand 22 and to hold the climbing sticks 62, 64 against the platform 60 of the hunting tree stand 22.

In an embodiment, the harness assembly 24 is provided where the harness assembly 24 has first and second upper straps 80, 82, a bridging strap 86, an upper strap buckle 84, first and second lower straps 90, 94, and first and second lower strap buckles 88, 92. The first upper strap 80 has a first end portion 130, a second end portion 132, and an intermediate portion 134 disposed between the first and second end portions 130, 132 thereof. The second upper strap 82 has a first end portion 140, a second end portion 142, and an intermediate portion 144 disposed between the first and second end portions 140, 142 thereof. The upper strap buckle 84 is coupled to the first end portion 130 of the first upper strap 80 and the first end portion 140 of the second upper strap 82. The bridging strap 86 has a first end portion and a second end portion. The first end portion of the bridging strap 86 is coupled to the intermediate portion 134 of the first upper strap 80 and is further coupled to the intermediate portion 144 of the second upper strap 82 such that a retention loop 96 is formed by the bridging strap 86, the first end portion 130 of the first upper strap 80, the upper strap buckle 84, and the first end portion 140 of the second upper strap 82.

The first lower strap buckle 88 is coupled to the second end portion 132 of the first upper strap 80. The first lower strap 90 has a first end portion 240 and a second end portion 242. The first end portion 240 of the first lower strap 90 is coupled to the first lower strap buckle 88. The second lower strap buckle 92 is coupled to the second end portion 142 of the second upper strap 82. The second lower strap 94 has a first end portion 280 and a second end portion 282. The first end portion 280 of the second lower strap 94 is coupled to the second lower strap buckle 92.

As shown in FIGS. 3 and 4, the harness system 100 is illustrated attached to the user carrying a hunting tree stand 22 and other equipment or tools for hunting. The harness assembly 24 is attached to the hunting tree stand 22, and worn and secured to the user across the chest, using a chest strap 44, and around the waist, using a belt 45. The user utilizes the harness assembly 24 to carry the hunting tree stand 22. The harness assembly 24 is operatively supported by the user's first and second shoulders 41, 42, and first and second gluteus medius muscle regions 51, 52. The harness assembly 24 may be secured across the chest 40 by the chest strap 44 to provide further support. The belt 45 is secured to the hunting tree stand 22. When the belt 45 is used in combination with the harness assembly 24, the belt 45 transfers a portion of the load of the tree stand 22, and other equipment, to the hips and waist of the user.

Figure 5:
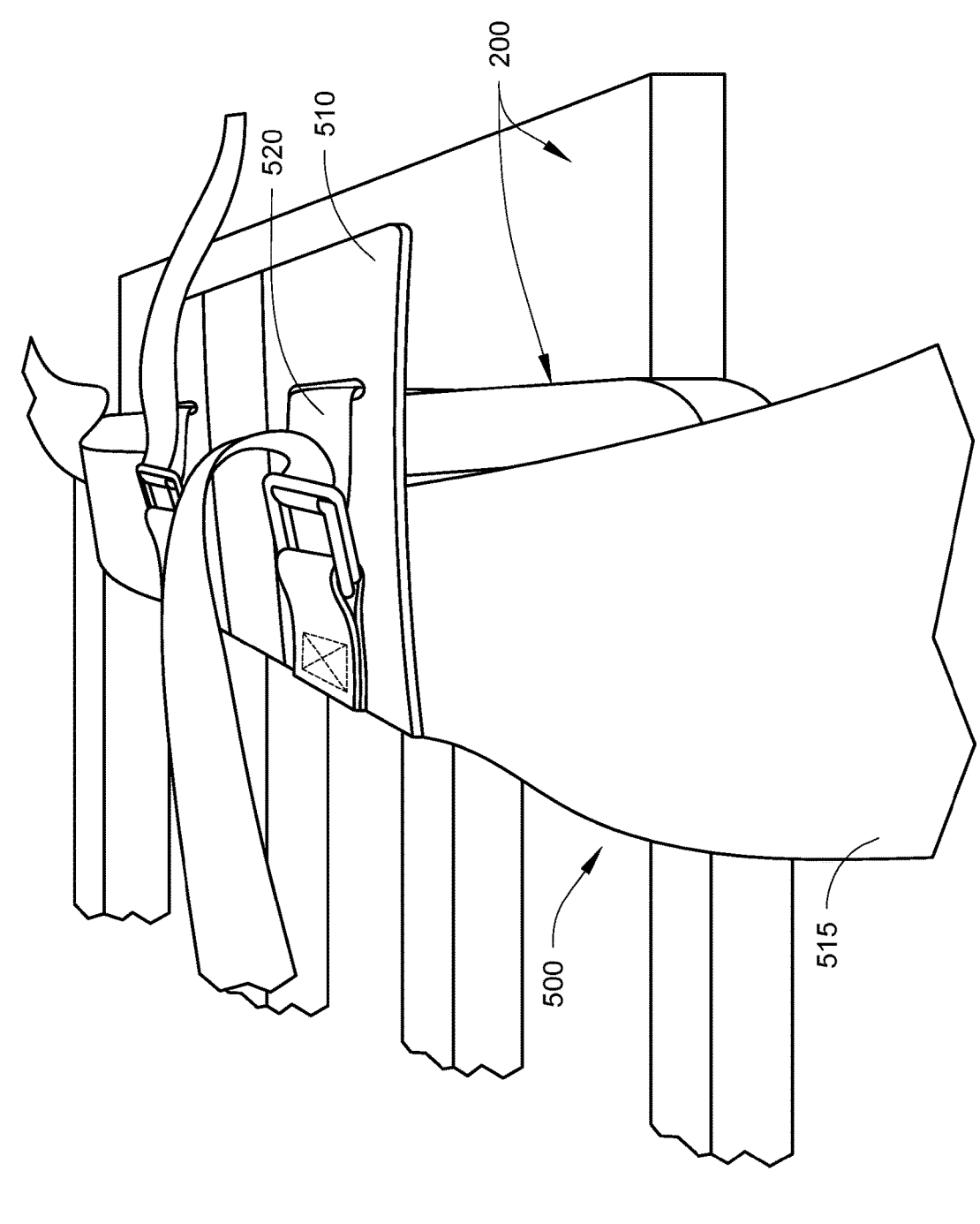
FIG. 5 is an enlarged side perspective view from above a belt attaching to a hunting tree stand, according to an embodiment.
Figure 6:
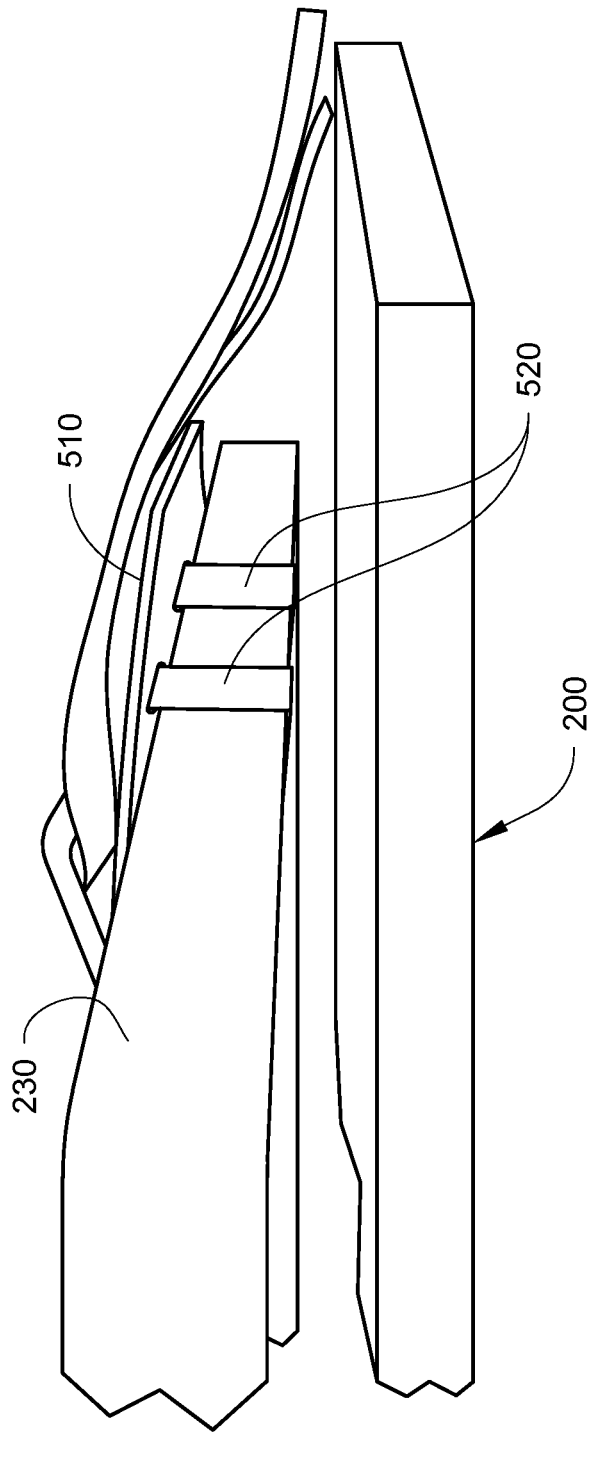
FIG. 6 is an enlarged side perspective view from below the belt of FIG. 5, according to an embodiment.

FIG. 5 is an enlarged side perspective view from above a belt 500 attaching to a hunting tree stand 200 ("stand"), according to an embodiment. FIG. 6 is an enlarged side perspective view from below the belt 500 of FIG. 5, according an embodiment. In an embodiment, the belt 500 can be the belt 45, and the hunting tree stand 200 can be the hunting tree stand 22 as shown in FIGS. 1-4 and described above.

Figure 8:
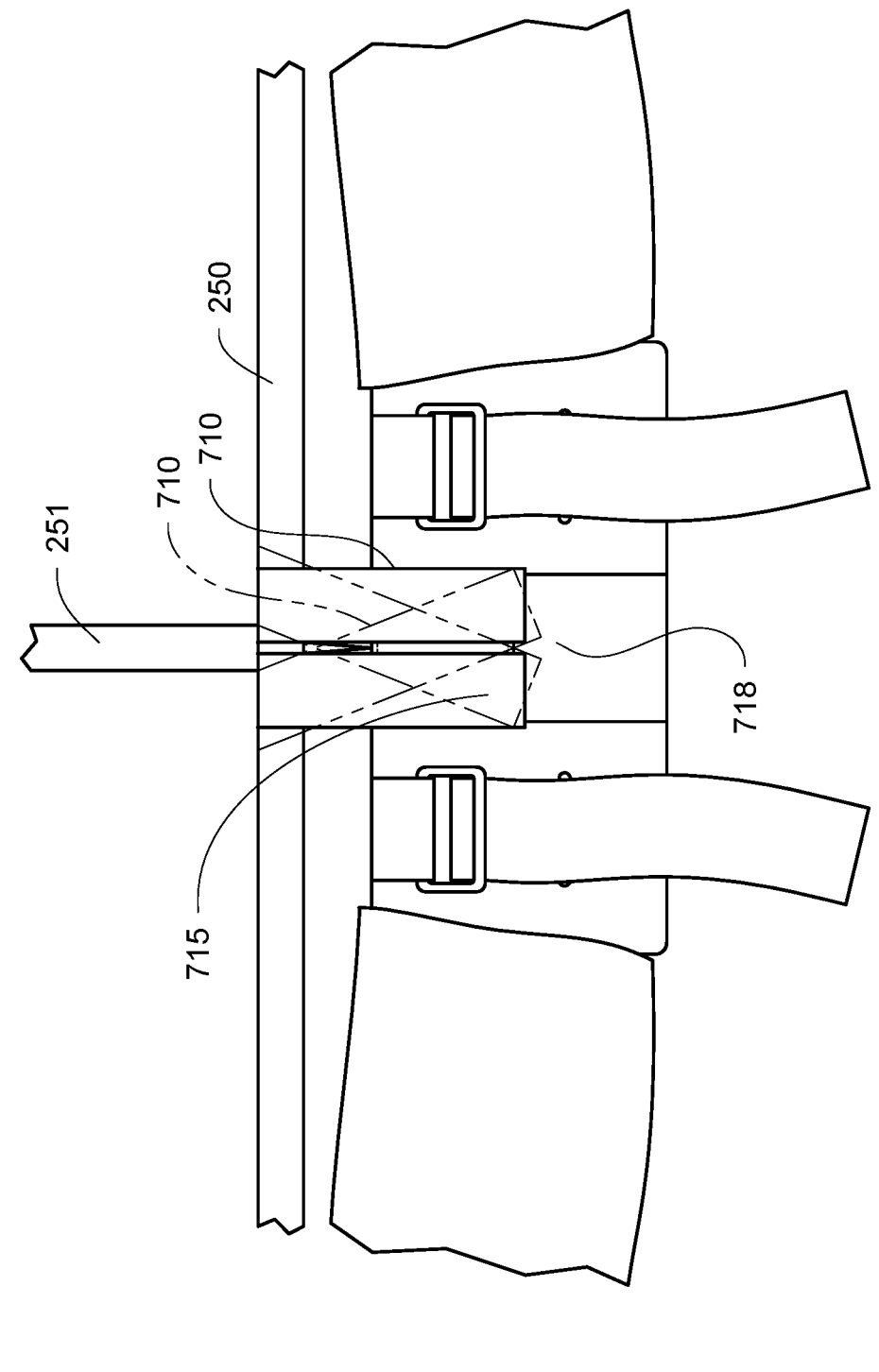
FIG. 8 is an enlarge view of the belt of FIG. 7 being attached to a hunting tree stand, according to an embodiment.

As shown in FIGS. 5 and 6, the belt 500 includes a body panel 510, an elongated member 515, a side buckle (e.g., side buckle 48 as shown in FIG. 3) and one or more hunting tree stand straps 520. In an embodiment, the elongated member 515 can be a panel strap 515 that extends from and/or over the body panel 510 for wrap around the waist of a user. The stand 200 includes a first section 230 and a second section and a section 250 (as shown in FIG. 8). The first section 230 can be, for example, be the platform 60, and the second section 250 can be the seat, frame, or other components of the hunting tree stand 200 that is movable relative to the first section 230.

At least one hunting tree stand strap 520 extends through the hunting tree stand 200 and encircles at least a first section 230 of the stand 200. The hunting tree stand straps 520 of the belt 500 are configured to firmly hold the first section 230 of the stand 200 against the body panel 510. The belt 500 in the illustrated embodiment includes a plurality of hunting tree stand straps 520 (e.g., at least two hunting tree stand straps 520). In another embodiment, the belt 500 may have a different number of the hunting tree stand straps 520. For example, the belt 500 in other embodiments may include a single hunting tree strap 520, three of the hunting tree straps 520, or more than three of the hunting tree straps 520. In an embodiment, each of the hunting tree straps 520 extends through the hunting tree stand 200 and encircles at least the first section 230 of the stand 200.

The body panel 510 has a base material configured to receive and/or connect to other components of the belt 500. The body panel 510 may be arranged to be disposed behind hip and/or waist 25 of the user (as shown in FIG. 4). For example, the body panel 510 can be configured to be positioned along the lower back of the user (e.g., as shown in FIG. 4). The body panel 510 connects to other components of the belt 500 to provide lumbar support, attachment to the stand 200, and preventing/dampening relative movements that create unwanted noises, or the like.

The elongated member 515 is an elongated material configured to wrap around the waist or hip of the user (as shown in FIG. 4 for the belt 45) so that the belt 500 stays on the waist or hip of the user. For example, the elongated member 515 is configured to secure the belt 500 to the wait or hip of the user. It is appreciated that the elongated member 515 can include one or more straps connected together to wrap around the wrist of the user. The elongated member 515 is configured to encircle the hip or waist of the user. In an embodiment, the elongated member 515, with the body panel 510, is configured to encircle the hip or waist of the user.

The belt 500 can be fastened using a fastener configured to receive the elongated member 515. The fastener can be the side buckle 48 as shown in FIG. 3. The buckle 48 may be a slip buckle, a slide buckle, a snap bucker, a cam buckle, or the like. In an embodiment, the buckle 48 can be a slip or slide buckle such that the buckle 48 contains no moving components to create unwanted noise and is less prone to breakage.

The hunting tree stand straps 520 can include a piece of elongated material arranged to have sufficient length to wrap around the first portion 230 of the stand 200. The hunting tree stand straps 520 may also be referred to as stand straps. In an embodiment, two stand straps 520 may be disposed on the body panel 510 symmetrically from a center line 220 (e.g., as shown in FIG. 1) such that, when the stand straps 520 attach to the stand 200 carried by the user, the weight of the stand 200 is evenly distributed among the left and the right sides of the user's body.

Figure 7:
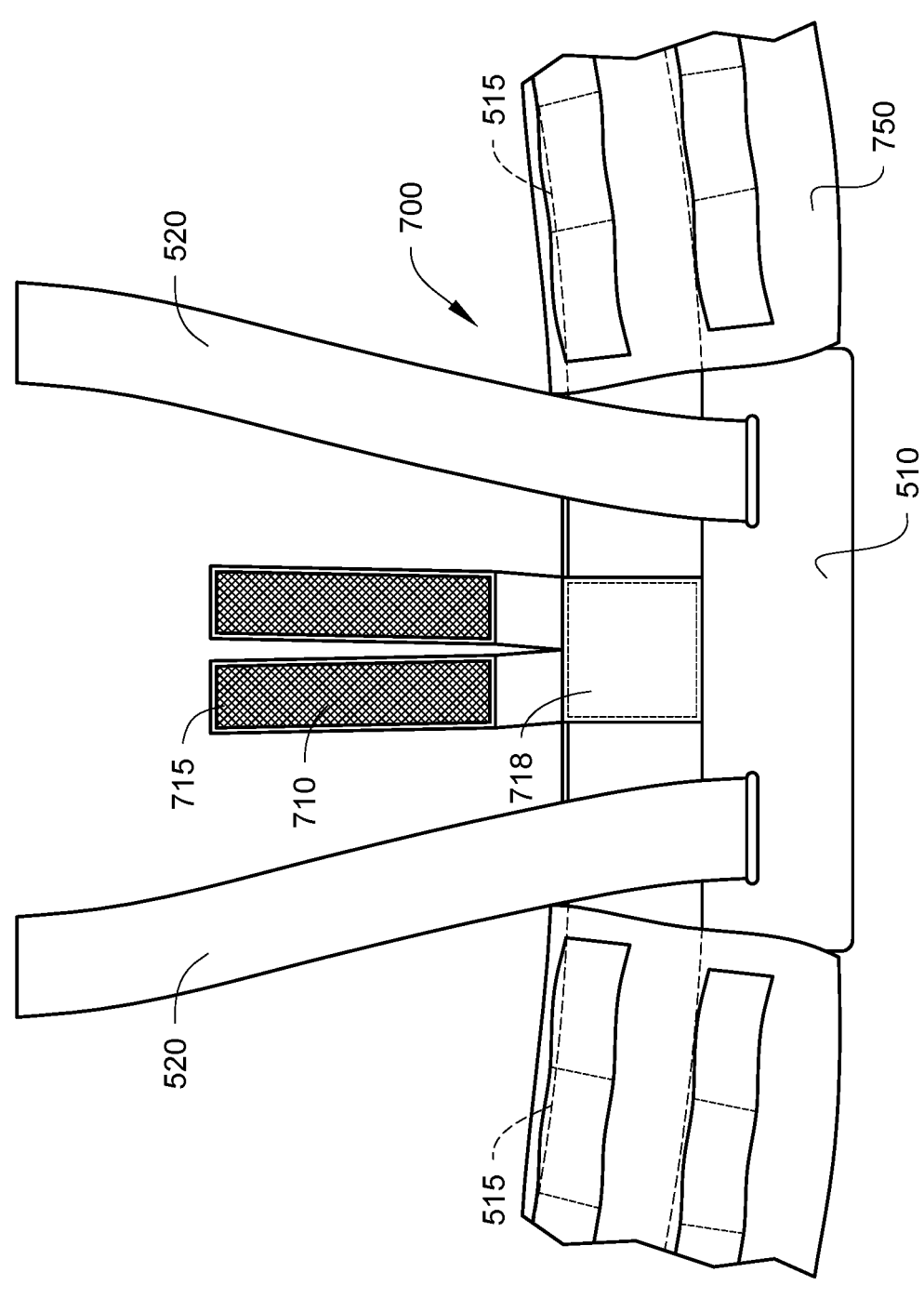
FIG. 7 is an enlarge view of a belt having stand straps, according to an embodiment.

FIG. 7 is an enlarge view of a belt 700 having stand straps 710, according to an embodiment. FIG. 8 is an enlarge view of the belt 700 in FIG. 7 being attaching to a hunting tree stand, according to an embodiment. In an embodiment, the belt 700 may be the belt 500 in FIGS. 5 and 6 with one or more of the stand straps 710.

As shown in FIGS. 7 and 8, the body panel 510 includes one or more stand straps 710 attached to the body panel 510. The stand straps 710 can have sufficient length and is configured to extend through at least a portion of the hunting tree stand 200 and encircle at least a second section 250 of the hunting tree stand 200. The hunting tree stand straps 710 of the belt 700 are configured to firmly hold the second section 250 against the body panel 510. The belt 500 in the illustrated embodiment includes a plurality of the straps 710 (e.g., at least two hunting tree stand straps 710). In another embodiment, the belt 500 may have a different number of the hunting tree stand straps 710. For example, the belt 500 in other embodiments may include a single hunting tree strap 710, three of the hunting tree straps 710, or more than three of the hunting tree straps 710. In an embodiment, the body panel 700 includes the stand straps 710 attached to the body panel 510. Each of the stand straps 710 has a sufficient length and is configured to extend through at least a portion of the hunting tree stand 200 and encircle at least a second section 250 of the hunting tree stand 200.

It is appreciated that the second section 250 can be a component of the hunting tree stand 200 that is movable relative to the first section 230 such that, when the user is moving, the first section 230 and the second section 250 (when not held) may knock against each other and create unwanted noise. The stand straps 710 firmly holds the second section 250 against the first section 230 and/or the body panel 510 to prevent or dampen noise created from relative movements between the first section 230 and the second section 250 of the stand 200.

In an embodiment, the elongated member 515 may be arranged to connect to the body panel 510. It is appreciated that the elongated member 515 may be covered by one or more sleeves 750 to provide padding and/or sound dampening between the elongated member 515 and the user. In an embodiment, the sleeves 750 can be attached to the body panel 510 such that the sleeve 750 and the elongated member 515 may be collectively referred to as a panel strap.

As shown in FIGS. 7 and 8, the stand straps 710 includes a first end 715 and a second end 718. The first ends 715 can be free ends detachable from the second ends 718. The second ends 718 is a fixed end that is fixedly attached to the body panel 510. In an embodiment, the stand straps 710 may be formed from a single piece of material (i.e., the free end is split to form two separated first ends 715) as shown in the illustrated example. The free ends may be fastened to the fixed ends crossing each other (as shown in dash lines in FIG. 8). In such embodiment, the free ends, such as the first ends 715, may be fastened cross each other to tighten the stand 200 and the belt 700 in the horizontal direction, e.g., when a vertical beam 251 is disposed between the two free ends. In an embodiment, the first ends 715 is fastened with hoop-and-loop fastener(s). In an embodiment, in each stand strap 710, the first end 715 can be a free end is detachable from the second ends 718. In each stand strap 710, the second end 718 can be a fixed end that is fixedly attached to the body panel 510.

Figure 9:
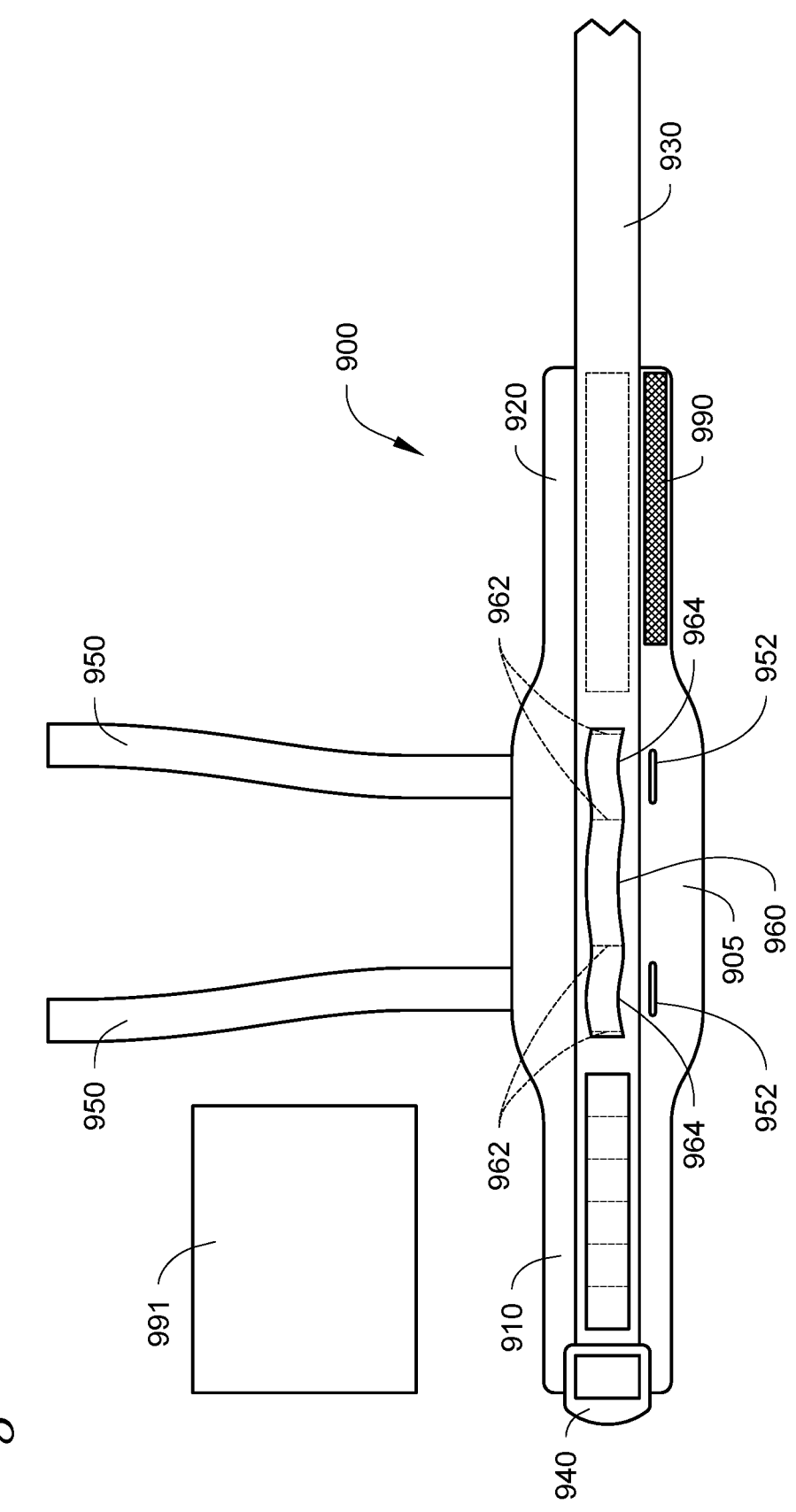
FIG. 9 is a schematic view of a belt configured to attach to a hunting tree stand, according to an embodiment.
Figure 10:
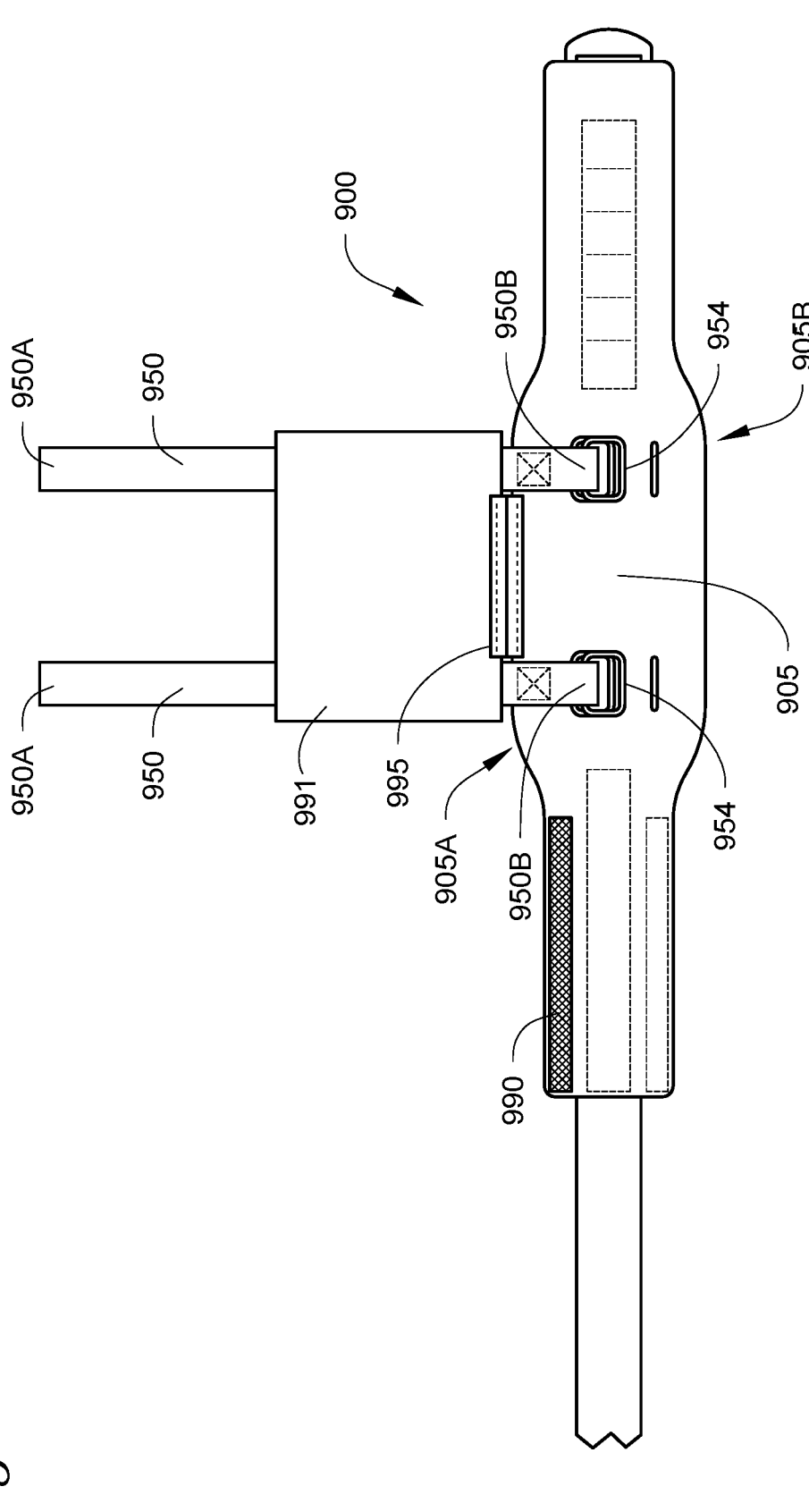
FIG. 10 is a schematic view of the belt opposite of the schematic view of FIG. 9.
Figure 11:
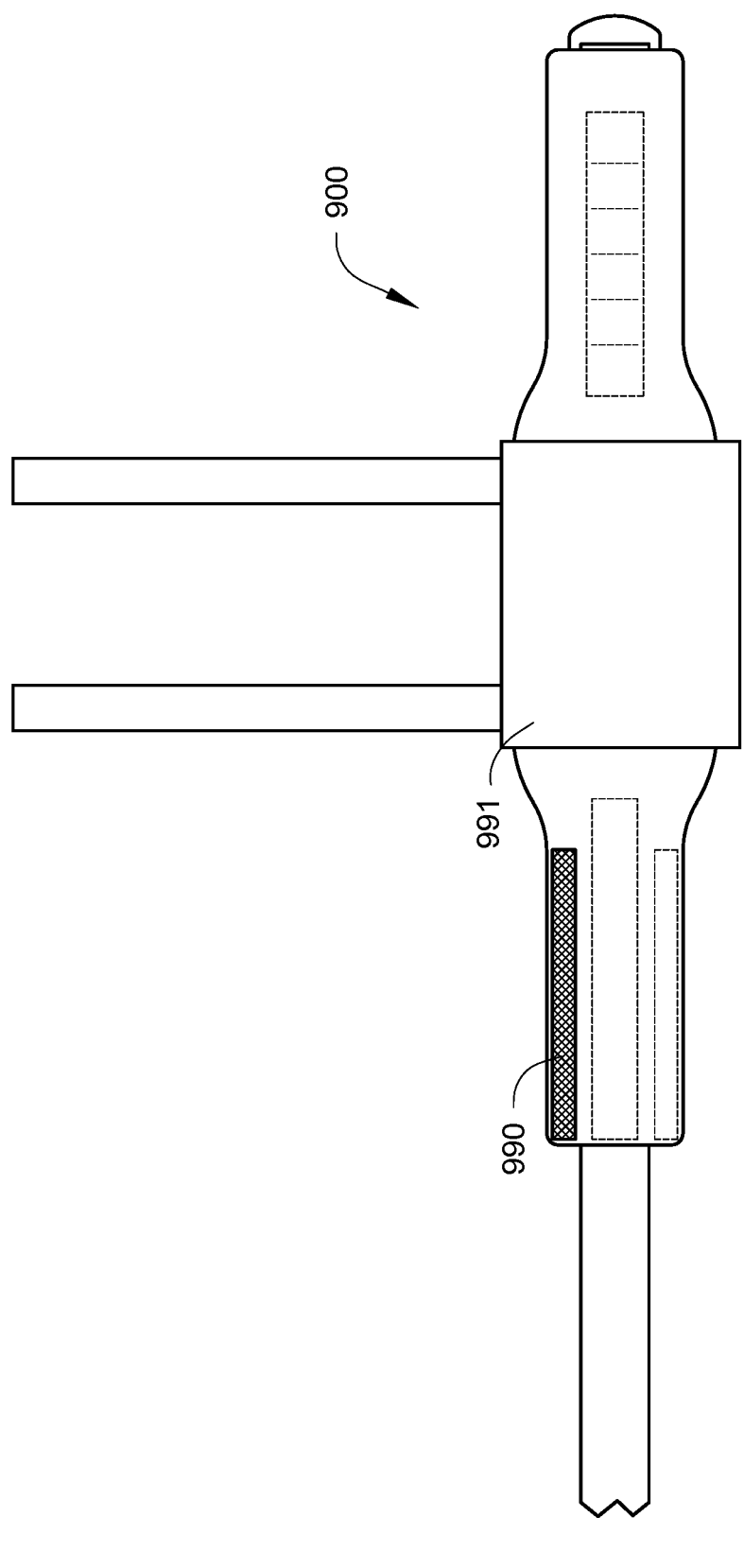
FIG. 11 is a schematic view of the belt with a body panel padding disposed on the belt as shown in FIG. 8.

FIG. 9 is a schematic view of a belt 900 configured to attach to a hunting tree stand, according to an embodiment. FIG. 10 is a schematic view of the belt 900 opposite of the schematic view of FIG. 9. FIG. 11 is a schematic view of the belt 900 with a body panel padding 991 disposed on the belt 900 according to the embodiment of FIG. 8.

As shown in FIGS. 9-11, the belt 900 includes a body panel 905, a first elongated member 910, a second elongated member 920, a panel strap 930, a side buckle 940, and one or more panel strap 950. In an embodiment, the belt 900 can be the belt 45, 500, and 700 as shown in FIGS. 1-8 and discussed above.

The body panel 905 attaches to the first elongated member 910 and the second elongated member 920 configured to wrap around a user (e.g., the user as show shown in FIGS. 3 and 4). In an embodiment, the body panel 905 can be the body panel 510 as shown, e.g., in FIGS. 5-8.

In an embodiment, the body panel 905 includes an upper portion 905A and a lower portion 905B. The stand straps 950 extends from the upper portion 905A of the body panel 905 and are configured to be received by one or more slots 952 located in the lower portion 905B. In the illustrated embodiment, each of the stand straps 950 extends from the upper portion 905A of the body panel 905 and is configured to be received by a corresponding the slots 952 in the lower portion 905B of the body panel 905. The lower portion 905B can be opposite from the upper portion 905A relative to a center of the body panel 905.

The panel strap 930 extends from one of the first elongated member 910 and the second elongated member 920. In an embodiment, one or more of the elongated member 910 and the elongated member 920 can be a side panel 910 and a side panel 920. The side panel 910 and the side panel 920 can each be a foam or fabric panel configured to warp around the waist of the user. In an embodiment, the first elongated member 910 and the second elongated member 920 are sufficiently long that, when the belt 900 wraps around the wrist of the user, the first elongated member 910 and the second elongated member 920 partially overlaps with each other. In an embodiment, the first elongated member 910 and the second elongated member 920 are sufficiently long that, when the belt 900 wraps around the wrist of the user, the first elongated member 910 and the second elongated member 920 reach the sides and the front of the user's body. In the illustrative example shown in FIGS. 9-11, the panel strap 930 attaches to the first elongated member 910, the body panel 905, the second elongated member 920. The panel strap 930 extends over the elongated member 920 and is configured to couple with the side buckle 940. In an embodiment, the panel strap 930 can be the elongated member 515 as shown, e.g., in FIGS. 5-8. In an embodiment, the panel strap 930 extends over the first elongated member 910 and the second elongated member 920, and the body panel 905 to extend out from the one of the first elongated member 910 and the second elongated member 920. As shown in the illustrative example, the panel strap 930 extends out from the elongated member 920.

The side buckle 940 attaches to another one of the first elongated member 910 and the second elongated member 920 relatives to the one of the first elongated member 910 and the second elongated member 920 from which the panel straps 930 extends. In the illustrative example shown in FIGS. 9-11, the side buckle 940 is disposed on the elongated member 910. The side buckle 940 is configured to be operationally coupled with the panel strap 930. Collectively, the side buckle 940 and the panel strap 930 are configured to tighten around and secure the belt 900 to the user. In an embodiment, the side buckle 940 can be attached to a fixed end of the panel strap 910. The fixed end of the panel strap 930 can be fixed to one of the first elongated member 910 and the second elongated member 920. In the illustrated example of FIG. 9, the fixed end of the panel strap 910 is fixed to the first elongated member 910. In an embodiment, the side buckle 940 can be the side buckle 48 as shown, e.g., in FIG. 3.

In an embodiment, the side buckle 940 can be attached and disposed on the fixed end of the panel strap 930 and the elongated member 910 or 920. In an embodiment, the side buckle 940 can be attached to one of the elongated member 910 or 920 by an extension member (e.g., as shown in FIGS. 3 and 4 that the side buckle 48 is attached to a body panel 50 via an extension strap 45A connecting the body panel 50 and the side buckle 48). It is appreciated that the panel strap 930 can tighten over the first elongated member 910 and the second elongated member 920 that wrap around the body of the user, according to an embodiment.

The one or more hunting tree stand straps 950 ("stand strap") attach to the body panel 905 and are configured to extend through the hunting tree stand and encircle at least a first section of the hunting tree stand (e.g., first section 230 as shown in FIG. 6). The hunting tree stand straps 950 are configured to firmly hold the first section against the body panel 905. In an embodiment, the stand straps 950 can be the stand straps 520 as shown in FIGS. 5-8 and discussed above. In an embodiment, each of the hunting tree stand straps 950 attaches to the body panel 905 and is configured to extend through the hunting tree stand and encircle at least a first section of the hunting tree stand.

As shown in FIG. 10, the stand straps 950 each includes a first end 950A and a second end 950B. In an embodiment, the first end 950A can be a free end and the second end 950B can be a fixed end affixed on the body panel 905 of the belt 900.

The stand straps 950 can be wrapped around a portion of the hunting tree stand (e.g., the first section 230 of the hunting tree stand 200 in FIG. 6) and, before the first end 950A coupling with the second end 950B, extends through the one or more slots 952 disposed in the body panel 905. The first end 950A can then couple with the second end 950B on the body panel 905.

In an embodiment, the first end 950A can couple with the second end 950B via one or more body panel buckles 954. For example, the body panel buckles 954 can include one or more buckles such as slip buckles, slide buckles, or the like. In an embodiment, the body panel buckles 954 can attach to the body panel 905. The body panel buckle 954 can be attached to a fixed end of the stand strap 950. In an embodiment, the fixed end of the stand strap 950 can be fixed on the body panel 905.

In an embodiment, the belt 900 can include a body panel padding 991 configured to be positioned between the body panel buckles 954 and the user. The body panel padding 991 can be formed from a foam, fabric, or other suitable material to provide comfort for the user wearing the belt 900. In an embodiment, the body panel padding 991 can be hinged to the upper portion 905A of the body panel 905 such that the body panel padding 991 can be opened to reveal the body panel 905, the slots 952, the body panel buckles 954, and/or the like. In an embodiment, a hinge 995 connects the body panel 905 and the body panel padding 991. The hinge 995 can be a fabric hinge stitched to the body panel padding 991 and the body panel 905.

In an embodiment, a body panel strap 960 can be disposed on the body panel 905 and selectively attaches to the body panel 905 and/or the panel strap 930 at a plurality of attaching sections 962 to form one or more flat strap loops 964. The flat strap loops 964 are positioned in-between adjacent attaching sections 962 such that other items can be attached to the belt 900 at the flat strap loops 964. In an embodiment, the body panel strap 960 is disposed over the panel strap 930 that is disposed over the body panel 905.

In an embodiment, one or more fasteners 990 can be included on the belt 900. As shown in FIGS. 10 and 11, the fasteners can be disposed on one or both side of the belt 900 for attaching accessories or tools onto the belt 900. For example, a bag having corresponding fasteners may be attached to the belt 900 via the fasteners 990. The fasteners 990 can be one or more hoop-and-loop fasteners.

Figure 12:
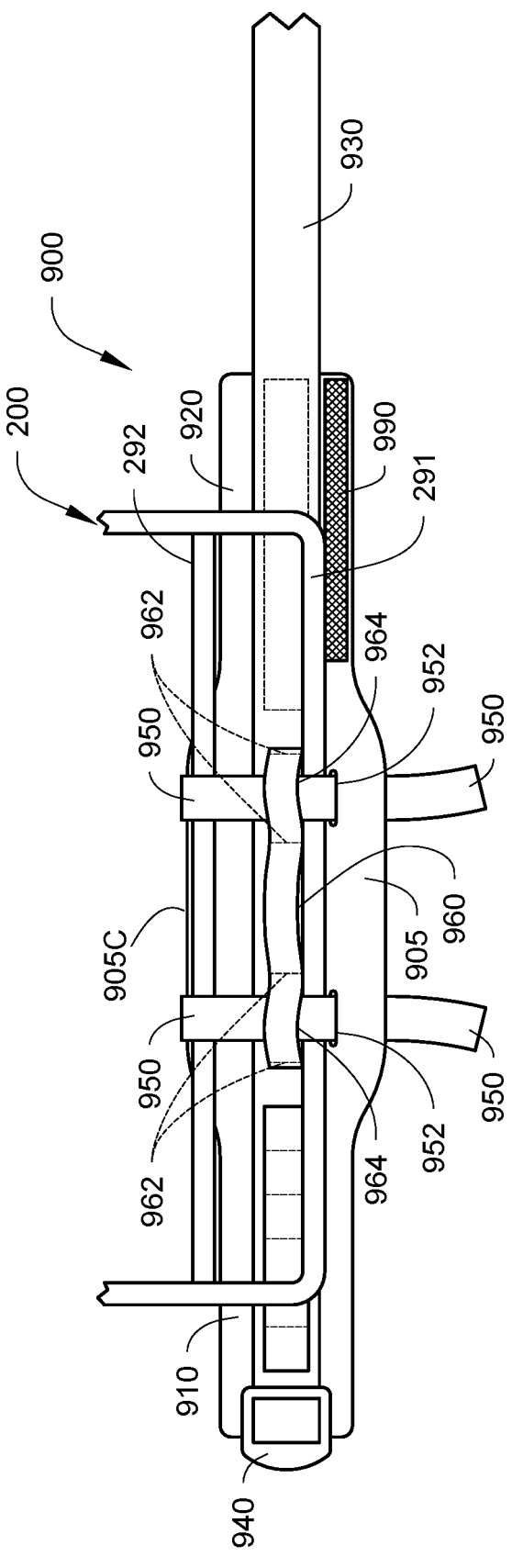
FIG. 12 is a schematic view of a belt attached to a hunting tree stand, according to an embodiment.

FIG. 12 is a schematic view of the belt 900 attached to the hunting tree stand 200, according to an embodiment. As shown in FIG. 12, the hunting tree stand 200 has a section that includes a first ledge 291, and a second ledge 292. The first ledge 291 can be a lower ledge in the section of the hunting tree stand 200. In an embodiment, the section can be the first or the second section 230 or 250 of the hunting tree stand 200 as shown, e.g., in FIGS. 6 and 8 and described above. The stand strap 950 is configured to wrap around the hunting tree stand 200 by folding at an upper lip 905C of the body panel 905, extending over the second ledge 292, extending under the body panel strap 960, extending over the first ledge 291, extending through the slot 952, and coupling to the body panel buckle 954 (e.g., as shown in FIG. 10). In an embodiment, when the stand strap 950 extending under the body panel strap 960, the stand strap 950 can be configured to extend through the flat strap loop 964.

In an embodiment, each of the stand straps 950 is configured to wrap around the hunting tree stand 200 by folding at an upper lip 905C of the body panel 905, extending over the second ledge 292, extending under the body panel strap 960, extending over the first ledge 291, extending through the slot 952, and coupling to the body panel buckle 954 (e.g., as shown in FIG. 10), respectively. In an embodiment, when the stand strap 950 extending under the body panel strap

960, each of the stand straps 950 can be configured to extend through the flat strap loop 964, respectively.

It is appreciated that, as shown in FIG. 12, the stand strap 950 is arranged to have sufficient length to be configured to be attached to two ledges of the hunting tree stand 200, such that, by tightening the stand strap 950, the interaction between the ledges and the body panel strap 950 firmly attaches the hunting tree stand 200 and the body panel 905, avoiding tilting between the body panel 905 and the tree stand 200.

Figure 13:
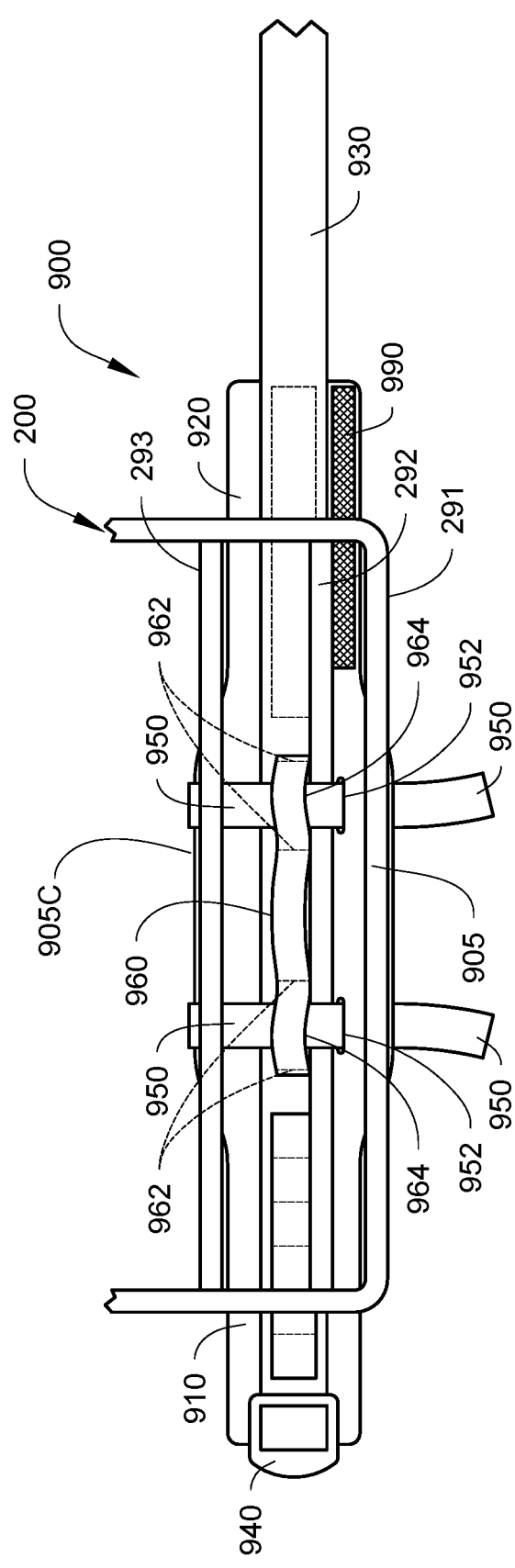
FIG. 13 is a schematic view of a belt attached to attach to a hunting tree stand, according to an embodiment.

FIG. 13 is a schematic view of the belt 900 attached to the hunting tree stand 200, according to an embodiment. As shown in FIG. 13, the hunting tree stand 200 has a section that includes a first ledge 291, a second ledge 292, and a third ledge 293. The panel strap 950 wraps over the second ledge 292. The first ledge 291 can be a lower ledge in the section of the hunting tree stand 200, relative to the second ledge 292. The third ledge 293 can be an upper ledge in the section of the hunting tree stand 200, relative to the second ledge 292. In an embodiment, the section can be the first or the second section 230 or 250 of the hunting tree stand 200 as shown, e.g., in FIGS. 6 and 8 and described above.

The stand strap 950 is configured to wrap around the hunting tree stand 200 by folding at the upper lip 905C of the body panel 905, extending under the third ledge 293, extending under the body panel strap 960, extending over the second ledge 292, extending through the slot 952, and coupling to the body panel buckle 954 (e.g., as shown in FIG. 10). In an embodiment, when the stand strap 950 extending under the body panel strap 960, the stand strap 950 can be configured to extend through the flat strap loop 964.

In an embodiment, each of the stand straps 950 is configured to wrap around the hunting tree stand 200 by folding at the upper lip 905C of the body panel 905, extending under the third ledge 293, extending under the body panel strap 960, extending over the second ledge 292, extending through the slot 952, and coupling to the body panel buckle 954 (e.g., as shown in FIG. 10), respectively. In an embodiment, when the stand strap 950 extending under the body panel strap 960, each of the stand straps 950 can be configured to extend through the flat strap loop 964, respectively.

It is appreciated that, the ledges 291-293 are arranged such that at least one ledge on each side (e.g., the first ledge 291 and the third ledge 293) of the ledge that is wrapped by the panel strap 950 (e.g., the second ledge 292) are disposed over the body panel 905. The ledges 291-293 are not required to be parallel with one another so long as the tightening force asserted by the stand strap 950 asserted on one of the ledges 291-293 is counteracted by the other two of the ledges 291-293 to avoid tilting between the body panel 905 and the tree stand 200.

It is further appreciated that, as shown in FIG. 13, the stand strap 950 is arranged to have sufficient length to be configured to be attached to one of the ledges 291-293 of the hunting tree stand 200, such that, by tightening the stand strap 950, the interaction between the ledges and the body panel strap 950 firmly attaches the hunting tree stand 200 and the body panel 905, avoiding tilting between the body panel 905 and the tree stand 200.

What is claimed is:

1. A belt for carrying a hunting tree stand, comprising:
   a body panel attaching to a first elongated member and a second elongated member configured to wrap around a user of the belt, the body panel includes an upper portion and a lower portion opposite from the upper portion, and a first slot and a second slot disposed in the body panel;

a panel strap extending from one of the first elongated member and the second elongated member;

a side buckle attached to another one of the first elongated member and the second elongated member, the side buckle configured to be operationally coupled with the panel strap, and the side buckle and the panel strap configured to tighten around and secure the belt to the user; and a first hunting tree stand strap and a second hunting tree stand strap extended from the body panel and configured to extend through the hunting tree stand and encircle at least a first section of the hunting tree stand, and the first hunting tree stand strap and the second hunting tree stand strap configured to firmly hold the first section of the hunting tree stand against the body panel, wherein at least one of:

the first hunting tree stand strap and the second hunting tree stand strap extend from the upper portion of the body panel and are configured to be received by the first slot and the second slot disposed in the lower portion of the body panel, respectively, or the belt further comprises a first body panel buckle and a second body panel buckle attached to the body panel and are configured to receive free ends of the first hunting tree stand strap and the second hunting tree stand strap that extend through the first slot and the second slot in the body panel, or the belt further comprises a first body panel buckle and a second body panel buckle attached to the body panel and a body panel padding configured to be disposed between the first body panel buckle attached to the body panel and the user, the body panel padding hinges to the upper portion of the body panel such that the body panel padding can be opened to reveal the body panel, the first slot in the body panel, the second slot in the body panel, the first body panel buckle, and the second body panel buckle.

2. The belt for carrying the hunting tree stand of claim 1, further comprising:

the first panel buckle and the second panel buckle attached to the body panel.

3. The belt for carrying the hunting tree stand of claim 1, wherein the first slot and the second slot allow the first hunting tree stand strap and the second hunting tree stand strap to extend through the body panel and couple to fixed ends of the first hunting tree stand strap and the second hunting tree stand strap.

4. The belt for carrying the hunting tree stand of claim 1, wherein the first hunting tree stand strap and the second hunting tree stand strap extend from the upper portion of the body panel and are configured to be received by the first slot and the second slot disposed in the lower portion of the body panel, respectively.

5. The belt for carrying the hunting tree stand of claim 1, further comprising:

the first body panel buckle and the second body panel buckle that are disposed on the body panel and are configured to receive the free ends of the first hunting tree stand strap and the second hunting tree stand strap that extend through the first slot and the second slot on the body panel.

6. The belt for carrying the hunting tree stand of claim 1, wherein the side buckle is disposed on the other one of the first elongated member and the second elongated member.

7. The belt for carrying the hunting tree stand of claim 6, wherein the side buckle is a slip buckle having a plurality of slots, the side buckle is configured to couple with the panel strap by receiving a free end on the panel strap through the plurality of slots so that noise from movable buckle components is avoided.

8. The belt for carrying the hunting tree stand of claim 1, further comprising:

the body panel padding configured to be disposed between the first body panel buckle and the user.

9. The belt for carrying the hunting tree stand of claim 1, further comprising:

the body panel padding configured to be disposed between the first body panel buckle and the user, wherein the body panel padding hinges to the upper portion of the body panel such that the body panel padding can be opened to reveal the body panel, the first slot in the body panel, the second slot in the body panel, the first body panel buckle, and the second body panel buckle.

10. The belt for carrying the hunting tree stand of claim 1, further comprising:

the first body panel buckle and the second body panel buckle, the first hunting tree stand strap and the second hunting tree stand strap include fixed ends that are opposite to the free ends, the first body panel buckle and the second body panel buckle being attached to the fixed ends of the first hunting tree stand strap and the second hunting tree stand strap, respectively.

11. The belt for carrying the hunting tree stand of claim 1, wherein the side buckle is attached to a fixed end of the panel strap.

12. The belt for carrying the hunting tree stand of claim 1, wherein the panel strap extends over the first elongated member, the second elongated member, and the body panel to extend out from the one of the first elongated member and the second elongated member.

13. The belt for carrying the hunting tree stand of claim 1, wherein a body panel strap is disposed on the body panel and selectively attaches to the body panel at a plurality of attaching sections to form at least one flat strap loops.

14. The belt for carrying the hunting tree stand of claim 1, wherein a body panel strap is disposed over the panel strap that is disposed over the body panel.

15. The belt for carrying the hunting tree stand of claim 1, further comprising:

a third hunting tree stand strap and a fourth hunting tree stand strap attached to the body panel and configured to extend through the hunting tree stand and encircle at least a second section of the hunting tree stand, wherein the third hunting tree stand strap and the fourth hunting tree stand strap are configured to firmly hold the second section of the hunting tree stand against the first section of the hunting tree stand and the body panel, and the second section is movable relative to the first section prior to being held by the third hunting tree stand strap and the fourth hunting tree stand strap, and, by firmly hold the second section against the first section of the hunting tree stand, and the body panel, noise from movements among the first section of the hunting tree stand, the second section of the hunting tree stand, and/or the body panel is avoided.

16. A harness system for carrying a hunting tree stand, comprising:

a harness assembly configured to attach to the hunting tree stand; and a belt configured to attach the hunting tree stand to a user, the belt including:

a body panel attaching to a first elongated member and a second elongated member configured to wrap around the user of the belt, the body panel includes an upper portion and a lower portion opposite from the upper portion, a first slot and a second slot disposed in the body panel;

a panel strap extending from one of the first elongated member and the second elongated member;

a side buckle attached to another one of the first elongated member and the second elongated member, the side buckle configured to be operationally coupled with the panel strap, and the side buckle and the panel strap configured to tighten around and secure the belt to the user; and a first hunting tree stand strap and a second hunting tree stand strap extended from the body panel and configured to extend through the hunting tree stand and encircle at least a first section of the hunting tree stand, and the first hunting tree stand strap and the second hunting tree stand strap configured to firmly hold the first section of the hunting tree stand against the body panel, wherein at least one of:

the first hunting tree stand strap and the second hunting tree stand strap extend from the upper portion of the body panel and are configured to be received by the first slot and the second slot disposed in the lower portion of the body panel, respectively, or the belt further comprises a first body panel buckle and a second body panel buckle attached to the body panel and are configured to receive free ends of the first hunting tree stand strap and the second hunting tree stand strap that extend through the first slot and the second slot in the body panel, or the belt further comprises a first body panel buckle and a second body panel buckle attached to the body panel and a body panel padding configured to be disposed between the first body panel buckle and the user, the body panel padding hinges to the upper portion of the body panel such that the body panel padding can be opened to reveal the body panel, the first slot in the body panel, the second slot in the body panel, the first body panel buckle, and the second body panel buckle.

17. The harness system for carrying the hunting tree stand of claim 16, wherein the harness assembly includes:

a first upper strap and a second upper strap each having a first end portion, a second end portion, and an intermediate portion disposed between the first and second end portions thereof, and a bridging strap having a first end portion and a second end portion, the first end portion of the bridging strap being coupled to the intermediate portion of the first upper strap and further coupled to the intermediate portion of the second upper strap such that a retention loop is formed by the bridging strap, the first end portion of the first upper strap, a upper strap buckle, and the first end portion of the second upper strap, the retention loop configured to extend through the hunting tree stand and encircle at least one ladder section of the hunting tree stand and to firmly hold the at least one ladder section against a back side of the hunting tree stand.

18. The harness system for carrying the hunting tree stand of claim 16, wherein the first hunting tree stand strap and the second hunting tree stand strap extend from the upper portion of the body panel and are configured to be received by the first slot and the second slot disposed in the lower portion of the body panel, respectively.

19. The harness system for carrying the hunting tree stand of claim 16, wherein the belt further comprises the first body panel buckle and the second body panel buckle that are configured to receive the free ends of the first hunting tree stand strap and the second hunting tree stand strap that extend through the first slot and the second slot on the body panel, respectively.

20. The harness system for carrying the hunting tree stand of claim 16, wherein the belt further comprises a body panel strap disposed on the body panel and that selectively attaches to the body panel at a plurality of attaching sections to form at least one flat strap loop, wherein the body panel strap is disposed over the panel strap that is disposed over the body panel.

* * * * *